US007838889B2

(12) United States Patent
Cok et al.

(10) Patent No.: US 7,838,889 B2
(45) Date of Patent: Nov. 23, 2010

(54) SOLID-STATE AREA ILLUMINATION SYSTEM

(75) Inventors: Ronald S. Cok, Rochester, NY (US); Paul J. Kane, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 525 days.

(21) Appl. No.: 11/837,026

(22) Filed: Aug. 10, 2007

(65) Prior Publication Data

US 2009/0039360 A1 Feb. 12, 2009

(51) Int. Cl.
*H01L 27/15* (2006.01)
*H01L 29/18* (2006.01)

(52) U.S. Cl. ...................... 257/79; 257/88; 257/E33.01

(58) Field of Classification Search .................. 257/13, 257/14, 88, 94, 79, 59, E29.071, E29.069, 257/17; 313/506, 504; 362/226, 227
See application file for complete search history.

(56) References Cited

U.S. PATENT DOCUMENTS 6,501,091 B1 * 12/2002 Bawendi et al. ............... 257/14
6,565,231 B1 * 5/2003 Cok ........................... 362/653
6,890,777 B2 * 5/2005 Bawendi et al. ............... 438/22
2004/0052076 A1 3/2004 Mueller et al.
2004/0090787 A1 5/2004 Dowling et al.
2004/0105264 A1 * 6/2004 Spero ......................... 362/276
2004/0155576 A1 * 8/2004 Tyan et al. .................. 313/504
2005/0006656 A1 * 1/2005 Jain et al. ..................... 257/88
2005/0051766 A1 * 3/2005 Stokes et al. .................. 257/17
2005/0073228 A1 * 4/2005 Tyan et al. .................. 313/110
2005/0230673 A1 * 10/2005 Mueller et al. ................ 257/13
2006/0232202 A1 * 10/2006 Matsuda et al. ............. 313/506
2007/0057263 A1 * 3/2007 Kahen ......................... 257/79
2007/0126004 A1 * 6/2007 Cok ............................ 257/59

FOREIGN PATENT DOCUMENTS

WO 99/57945 5/1999

* cited by examiner

*Primary Examiner*—Lynne A Gurley
*Assistant Examiner*—Galina Yushina
(74) *Attorney, Agent, or Firm*—Stephen H. Shaw; Raymond L. Owens

(57) ABSTRACT

A solid-state area illumination system includes multiple LED devices, each LED device is formed on a separate substrate and each LED device emits differently colored light at different angles relative to the substrate. The peak frequencies of each color of light differ by at least the smallest of the full width half maximums of the frequency distributions of emitted light. Also included is a support for positioning each of the LED devices at multiple orientations relative to an area of illumination upon a surface, so that any point within the area of illumination will receive multiple colors of light from more than one of the LED devices at different angles. Each LED device includes one or more light-emitting elements, each light-emitting element having multiple sizes of core/shell quantum-dot emitters formed in a common polycrystalline semiconductor matrix.

16 Claims, 5 Drawing Sheets

50
52
38
50
52
38
30
35
39
39A
39B
36
32
40
34
22
31
37
33

SOLID-STATE AREA ILLUMINATION SYSTEM

FIELD OF THE INVENTION

The present invention relates to the use of light-emitting diodes for area illumination, and specifically to broadband illumination using colored light emitters.

BACKGROUND OF THE INVENTION

Solid-state lighting devices made of light-emitting diodes (LEDs) are increasingly useful for applications requiring robustness and long life. For example, solid-state LEDs are found today in automotive applications. These devices are typically formed by combining multiple, small LED devices providing a point light source into a single module together with glass lenses or reflectors suitably designed to direct the light as is desired for a particular application; see for example, WO99/57945, published Nov. 11, 1999. These multiple devices are expensive and complex to manufacture and integrate into single illumination devices. Moreover, point sources of light such as LEDs or incandescent lamps tend to require additional light diffusers, e.g. lampshades, to avoid glare.

Organic light-emitting diodes (OLEDs) are manufactured by depositing organic semiconductor materials between electrodes on a substrate. This process enables the creation of area-emitting light sources having an extended light-emitting surface area on a single substrate, thereby reducing glare and improving the efficiency of illumination. The prior art describes the use of one or more OLEDs in lighting, for example U.S. Pat. No. 6,565,231, entitled "OLED Area Illumination Lighting Apparatus" filed by Cok on May 28, 2002. In particular, the use of specially constructed layers within an OLED device to form optical cavities that can enhance the amount of light output from an OLED device is known. For example, U.S. Application Publication No. 2004/0155576 filed Feb. 4, 2004, entitled "Microcavity OLED Devices" describes such an OLED device. Other means, such as diffraction gratings can be employed to similar effect. Because these layers in these devices provide an optical filtering effect, the layers are carefully selected to minimize frequency dependence on the angle of emission for the emitted light. Alternatively, scattering or diffusing elements are employed to maintain a consistent color of light emitted over the surface of the OLED device and at any viewed angle.

A skilled artisan appreciates that these techniques involve filtering, reflecting or otherwise processing light generated by the OLED device and that with each such processing step, a portion of the light generated by the OLED device can be subject to optical losses, thus the overall efficiency of such an illumination system as measured in terms of lumens per watt of supplied energy may decrease. Furthermore, the efficiency of an area-illumination system can be a critical feature in the selection of one form of area illumination as compared against other potential forms of area illumination, particularly, where vast areas such as roadways, athletic stadiums, or other areas are to be illuminated. Moreover, each processing step may incur additional manufacturing costs.

Another factor in the selection of an area-illumination system is the aesthetic appeal or lack thereof of the selected area-illumination system itself. Colored lights are sometimes employed as decoration or specialty lighting, for example, as holiday lighting. Colored illumination is typically provided using filters over white-light lamps. See for example, US 2004/0090787 entitled "Methods and Systems for Illuminating Environments" published May 13, 2004; US 2004/0052076 entitled "Controlled Lighting Methods and Apparatus" published Mar. 18, 2004; and US 2004/0105264 "Multiple Light-Source Illuminating System", published Jun. 3, 2004. However, it can be appreciated that here too, the filters absorb light, reduce the efficiency of the illumination system, and cause the area illuminated thereby to take on the colors of the filtered light.

A solid-state area illumination system has been described by Cok in US 2007/0126004A1 "Lamp with Multi-Colored OLED Elements", published Jun. 7, 2007, comprising a plurality of OLED devices, each device formed on a separate substrate and each device emitting light at a plurality of angles relative to the substrate, the emitted light having different ranges of frequencies at different ranges of the plurality of angles; and a support positioning each of the plurality of OLED devices at a plurality of orientations relative to an area of illumination, the positioning being defined so that any point on any surface within the area of illumination receives a broadband combination of light from more than one of the OLED devices. In this system, light filtering and processing steps are eliminated, so that efficient use of light is maintained. Further, the angular variation of emission color associated with thin-film electroluminescent devices is used to facilitate color mixing, so that each point on a surface is illuminated diffusely by a combination of colors, each color having emanated from a different OLED device at a different illumination angle, resulting in white light at the surface point. The OLED solid-state area-illumination system of US 2007/0126004A1 does not clearly distinguish colors at different angles of emission from the substrate, because of the broadband emission therein. This may lead to reduced aesthetic value in that a perceptively reduced range and saturation of colors is produced when viewing the OLED devices. Therefore, the colors are reduced in variation and are not easily distinguished from one another. Moreover, the OLED solid-state area illumination system of US 2007/0126004A1 may have shorter lifetimes than conventional illumination, lower efficiencies, and require expensive encapsulation for device operation. Therefore, an alternative technology having improved performance is still desired.

SUMMARY OF THE INVENTION

The present invention provides an improved technology over OLED solid-state area illumination systems, with an inorganic solid-state area illumination system that includes multiple LED devices, each LED device is formed on a separate substrate and each LED device emits differently colored light at different angles relative to the substrate. The peak frequencies of each color of light differ by at least the smallest of the full width half maximums of the frequency distributions of emitted light. Also included is a support for positioning each of the LED devices at multiple orientations relative to an area of illumination upon a surface, so that any point within the area of illumination will receive multiple colors of light from more than one of the LED devices at different angles. Each LED device includes one or more light-emitting elements, each light-emitting element having multiple sizes of core/shell quantum dot emitters formed in a common polycrystalline semiconductor matrix.

Another aspect of the present invention provides a method of forming a solid-state area illumination system, including the following steps of:

a) forming multiple sizes of core/shell quantum dot emitters in a common polycrystalline semiconductor matrix, each different size of quantum dot emitter having a peak emission frequency and emission bandwidth;

b) forming a plurality of light-emitting elements, each light-emitting element including a succession of layers comprising an optical microcavity, each optical microcavity including an emissive layer containing the a population of quantum dot emitters of one or more sizes, wherein an emission bandwidth of each population of quantum dot emitters in each light-emitting element is tuned to a frequency response of the optical microcavity of that light-emitting element;

c) forming a plurality of LED devices, each LED device comprising one or more light-emitting elements, each device on a separate substrate and each device emitting light at a plurality of angles relative to the substrate, the emitted light have different colored light at different angles; and d) providing a support positioning each of the plurality of LED devices at a plurality of orientations relative to an area of illumination, said positioning being defined so that any point on any surface within the area of illumination will receive multiple colors of light from more than one of the LED devices.

DETAILED DESCRIPTION OF THE INVENTION

In recent years, light-emitting diode (LED) devices have included quantum-dot light-emitting layers to provide large-area light emission. One of the predominant attributes of this technology is the ability to control the wavelength of emission, simply by controlling the size of the quantum dot. This fact has been discussed in a paper by Bulovic and Bawendi, entitled "Quantum Dot Light Emitting Devices for Pixelated Full Color Displays" and published in the proceedings of the 2006 Society for Information Display Conference. As discussed in this paper, the ability to tune light emission provides opportunities for creating narrow-band and, therefore, highly-saturated colors of light emission. Alternatively, broader-band emitters or combinations of emitters can be made to create less saturated colors, or white light. Control of the dominant wavelength and spectral bandwidth allows the designer flexibility in solving a variety of illumination problems.

Additionally, crystalline-based inorganic LEDs have the advantages of high brightness, long lifetimes, good environmental stability, and good external quantum efficiencies. However, inorganic LEDs have not been widely available in a wide planar format. The inventors have deemed it beneficial, therefore, to develop an improved solid-state area illumination system that would take advantage of the desirable attributes of crystalline-based inorganic LEDs in a flat-panel format. Recently, a light-emitting layer composed of quantum dots that are simultaneously luminescent and conductive was presented by Kahen in co-pending application US 2007/0057263 A1. Also presented was an all-inorganic LED device incorporating such a layer. The electron- and hole-transport layers of the device are also composed of conductive nanoparticles. For this LED device, all device layers are deposited by low-cost processes such as drop casting or inkjetting. The resulting inorganic LED device offers low cost and enhanced brightness as compared to OLEDs, along with tuning over a wide range of wavelengths, accomplished with known techniques pertaining to quantum dots. The quantum-dot LED provides the opportunity to construct planar emitting devices that have the advantages of inorganic semiconductor technology mentioned above and, when skillfully applied, can improve the solid-state area illumination system previously described.

Figure 1:
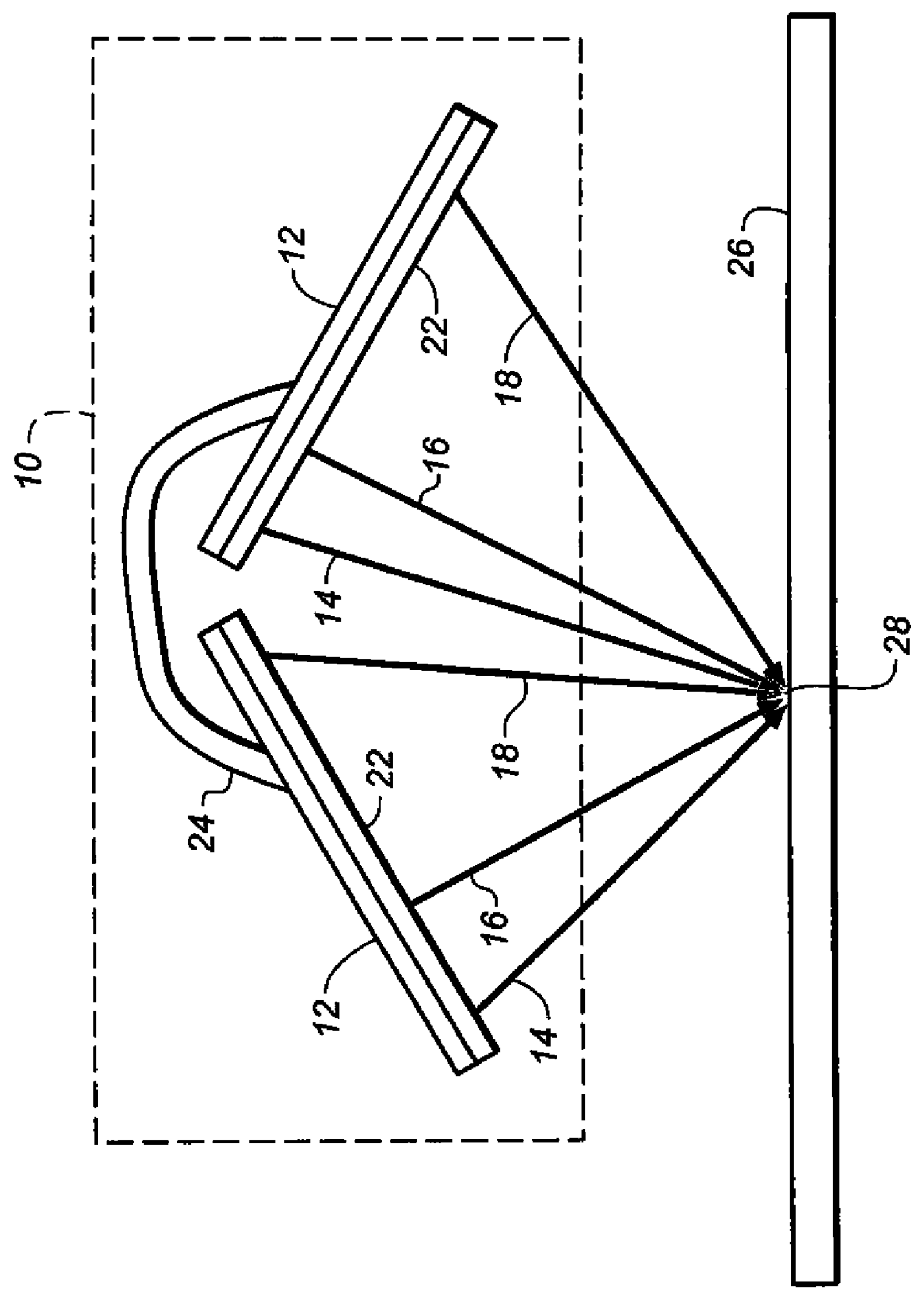
FIG. 1 is a schematic illustration of one embodiment of a solid-state area illumination system according to one embodiment of the present invention.

According to an embodiment of the present invention, a solid-state area-illumination system 10 as shown in FIG. 1 comprises a plurality of LED devices 12, each device formed on a separate substrate 22, and each device emitting light (14, 16, 18) at a plurality of angles relative to the substrate. The emitted light has different ranges of frequencies (i.e., differently colored light) at different angles. As shown in the example embodiments of FIGS. 1 and 2, a support 24 positions the plurality of LED devices 12 at a plurality of orientations relative to an area of illumination 28. The positioning is such that any point within the area of illumination 28 on a surface 26 will receive a contribution of different frequencies of light from more than one of the plurality of LED devices 12.

Figure 3:
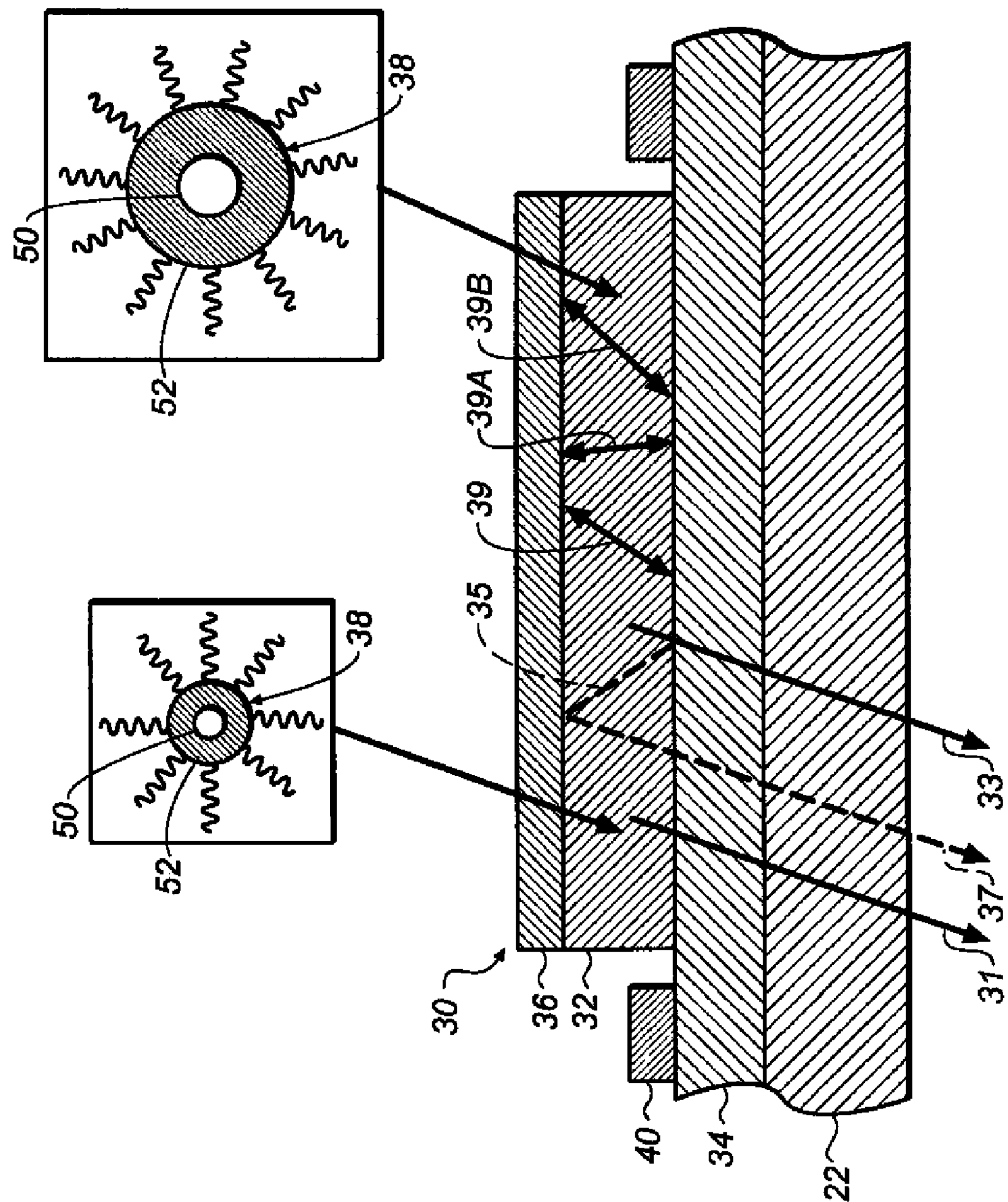
FIG. 3 is a cross-sectional view of a light-emitting element according to one embodiment of the present invention.

Furthermore, according to the present invention, each LED device 12 is formed on a separate substrate 22, and comprises one or more light-emitting elements 30, such as the one shown in FIG. 3. FIG. 3 shows a cross-sectional view of a light-emitting element of the present invention. As shown in this figure, the light-emitting element 30 incorporates the core/shell quantum dot inorganic light-emitting layer 32 formed in a common polycrystalline semiconductor matrix. Each different size of quantum dot emitter in each light-emitting element has a center emission frequency and emission bandwidth. Each light-emitting element 30 further includes a succession of layers comprising a plurality of optical microcavities 39, 39A, and 39B formed at the plurality of angles, wherein an emission bandwidth of each population of quantum dot emitters in each light-emitting element 30 is tuned to a frequency response of one of the plurality of optical microcavities of that light-emitting element.

Figure 2:
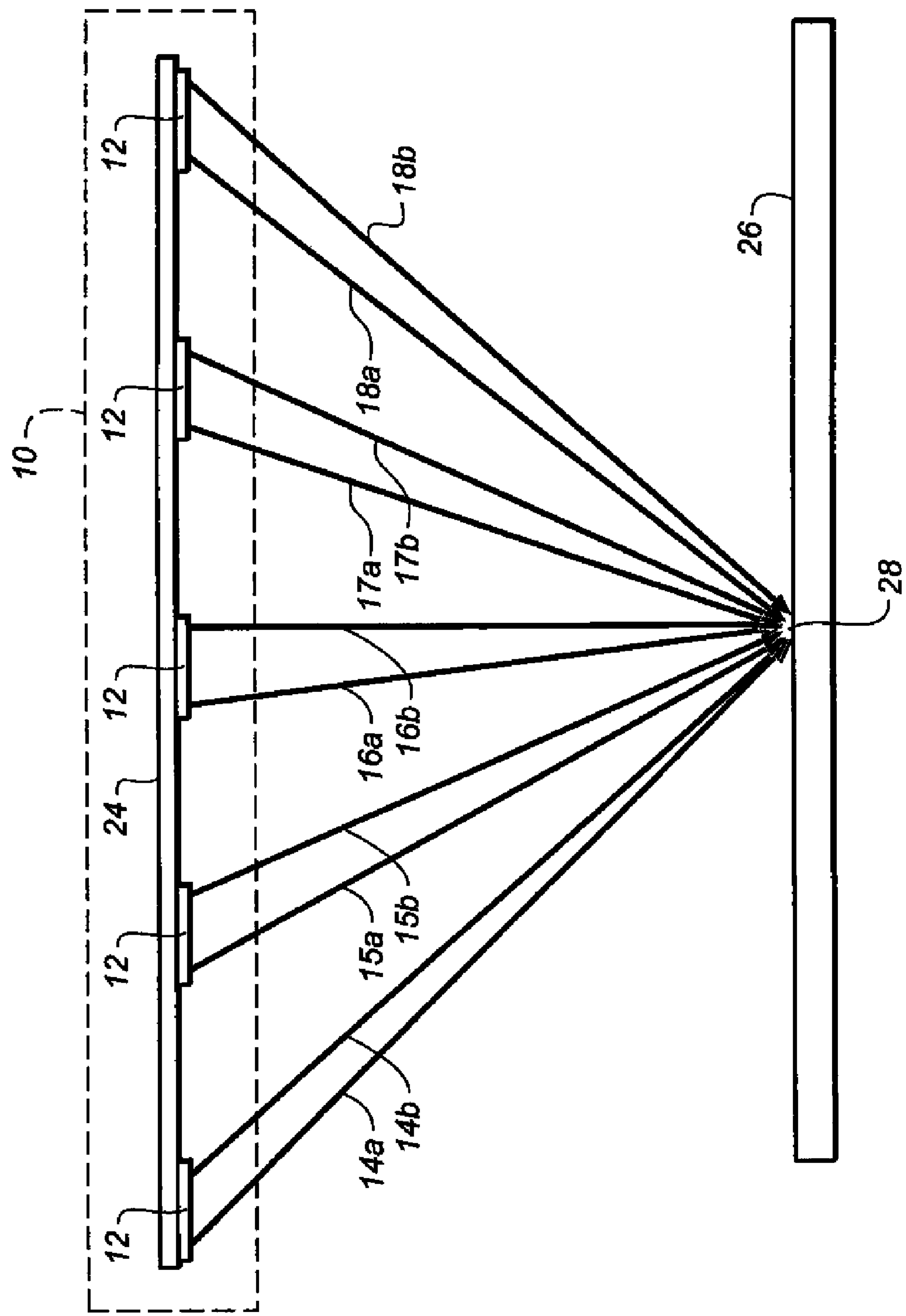
FIG. 2 illustrates a surface illumination made by one embodiment of a solid-state area illumination system according to one embodiment of the present invention.

Two or more of the LED devices 12 may have substrates located in different planes, as shown in FIG. 1. Alternatively, two or more of the LED devices 12 may have substrates located in a common plane, as shown in FIG. 2. In either case, the plurality of LED devices 12 have a plurality of orientations relative to an area of illumination since the illumination area has a limited extent and each LED device 12 illuminates each point in the illumination area 28 at a different angle from the LED device substrate 22.

Referring to FIG. 3, the substrate 22 supports deposited semiconductor and metal layers. Substrate 22 should preferably be sufficiently rigid to enable the deposition processes, and such that it can withstand a thermal annealing processes (maximum temperatures of ~285° C.) as explained by Kahen in US 2007/0057263 A1. Substrate 22 can be transparent or opaque. In this application it is preferably transparent. Possible transparent substrate materials include glass and some plastics. The next deposited material is an anode 34, deposited on the top surface of the substrate 22 and comprised of a transparent conductor, such as indium tin oxide (ITO). Sputtering or other well-known procedures in the art can deposit the ITO. The ITO is typically annealed at ~300° C. for one hour to improve its transparency. Because the sheet resistance of transparent conductors such as ITO is much greater than that of metals, bus metal 40 can be selectively deposited through a shadow mask, using thermal evaporation or sputtering, to lower the voltage drop from the contact pads to the actual device. Inorganic light-emitting layer 32 is deposited next. It can be dropped or spin cast onto the transparent conductive anode 34. Other deposition techniques such as inkjetting of the colloidal quantum dot-inorganic nanoparticle mixture can also be used. Lastly, a cathode 36 metal is deposited over the inorganic light-emitting layer 32. Candidate cathode 36 metals are ones that form an ohmic contact with the material comprising the inorganic nanoparticles 38. For example, in a case where the quantum dots are formed from ZnS inorganic nanoparticles, a preferred metal is Al. It can be deposited by thermal evaporation or sputtering.

Although not shown in FIG. 3, a p-type transport layer and an n-type transport layer may be added to the device to surround the inorganic light-emitting layer 32. As is well known in the art, LED structures typically contain doped n- and p-type transport layers. The transport layers serve several purposes: (1) formation of ohmic contacts to the emitter layer; (2) mitigation of surface plasmon effects at the metal contacts, by spacing the emitter layers from the metal contacts with sufficiently thick (at least 150 nm) transport layers; (3) enhanced injection of electrons and holes into the emitter layer; and (4) prevention of leakage of the carriers back out of the emitter layer. Suitable annealing procedures for colloidal dispersions of nanoparticles, that can be used to form the inorganic light-emitting layer 22 and the transport layers, are described in detail by Kahen.

The inorganic light-emitting layer 32 will preferably comprise a plurality of light-emitting cores 50, each core having a semiconductor material that emits light in response to a recombination of holes and electrons, each such light-emitting core defining a first bandgap; a plurality of semiconductor shells 52 formed respectively about the light-emitting cores 50 to form core/shell quantum dots 38, each such semiconductor shell 52 having a second bandgap wider than the first bandgap; and a semiconductor matrix connected to the semiconductor shells 52 to provide a conductive path through the semiconductor matrix and to each such semiconductor shell, and its corresponding light-emitting core 50, so as to permit the recombination of holes and electrons.

Every LED device built in a thin-film stack configuration such as FIG. 3, in which an emissive layer is sandwiched between conducting electrodes, has the potential to exhibit optical interference effects. For example, in the device of FIG. 3, the cathode 36 is preferably a highly conductive metal that, in this application, is also preferably highly reflecting. The reflectance of the anode 34 will vary, depending on the material. In any case, the anode 34 must be at least partially transparent to allow the device to emit light, however some reflection back in the direction of the cathode 36 is inevitable. The cathode 36 and anode 34 therefore form a resonant optical cavity, since multiple reflections occur between them. As shown by example in FIG. 3, light ray 31, representing the path of photons emanating from inorganic light-emitting layer 32 as the result of electron-hole pair recombination events, passes directly through the interface between light-emitting layer 32 and anode 34, and similarly passes through the other interfaces to exit the device. Another light ray 33 undergoes a partial reflection 35 at the interface between the light-emitting layer 32 and the anode 34, resulting in a third light ray 37 that, in this case, exits the device without further partition. Light rays 31, 33 and 37 all exit the device parallel to each other, and therefore are brought to focus at the same point when viewed (not shown in the figure). Light rays 31 and 33 travel the same optical path, which is the sum of the products of the physical distance through each medium traversed times the index of refraction of the respective media, whereas light ray 37 travels a slightly longer optical path due to the partial reflection 35. Depending on the wavelength of the light and the exact thickness of the light-emitting layer 32, light ray 37 can either constructively or destructively interfere with light rays 31 and 33. Such interference effects are well understood in the art, and form the basis for operation of devices such as interference filters and anti-reflection coatings. The analysis of thin-film stacks composed of multiple layers is more complex but is based on the same principles. Stacks containing an emissive material inside a small resonant cavity require a more rigorous analysis based on electromagnetic theory (see for example, A. Dodabalapur, "Physics and Applications of Organic Microcavity Light Emitting Diodes", Journal of Applied Physics 80 (12), 6954-6964, 1996). When such a device is constructed such that one electrode is perfectly reflecting and the other is almost perfectly reflecting, the device is termed a resonant-cavity LED (RCLED), and the device exhibits two main characteristics: (1) there is a narrowing of the frequency spectrum of the light output along with an increase in intensity at the peak of the frequency response and (2) the output of the frequency spectrum becomes increasingly sensitive to the observation angle relative to the surface normal. These characteristics are observed in any thin-film stack LED device, also with electrodes of lesser reflectance, to a lesser degree.

Figure 4:
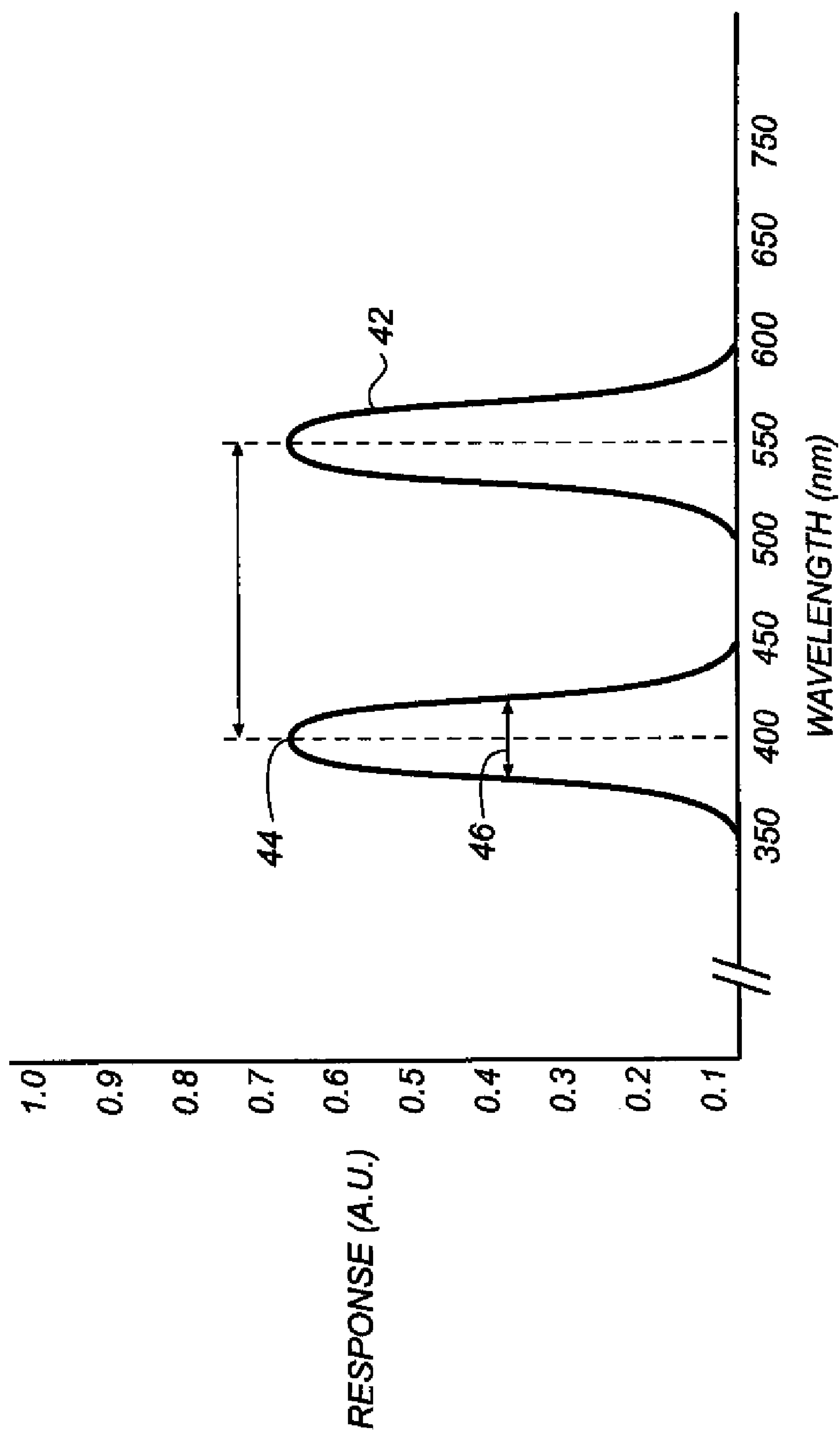
FIG. 4 is a model QD-LED spectral emission curve known in the prior art.

To maximize the output of LED devices, it is necessary to match the emission spectrum of the active material to the response of the optical cavity in which it is placed, or conversely to "tune" the cavity to match the emission spectrum. In the case of quantum dots, differently-sized quantum dots may be formed and each differently-sized quantum dot will emit light at a different peak wavelength, even while using differently-sized dots made of the same semiconductor material. Therefore the dominant or peak wavelength is said to be substantially continuously variable. This is in contrast to the choice of peak wavelength in traditional LED devices, which require choosing different semiconductor materials to change the emitting wavelengths. As described in the paper by Bulovic and Bawendi and elsewhere, there is a potential for quantum dot LED (QD-LED) materials to become available that will enable the placement of emitters with peak wavelength at selectable points across the visible spectrum and spectral bandwidths (as measured by the full width at half maximum, or FWHM) on the order of 30 nm, simply by changing the size of the quantum dots. For example, FIG. 4 demonstrates a Gaussian model for a QD-LED spectral emission curve 42 in which the spectral power in arbitrary units (a.u.) is plotted as a function of wavelength in nanometers. The emitter curve includes a peak wavelength 44 and a FWHM 46. In accord with the present invention, the FWHM 46 of the emission spectrum of each population of quantum dot emitters in each light-emitting element 30 is tuned to the cavity response of each light-emitting element 30. Tuning of the emission spectrum is defined to mean that the product of the two spectral curves, one curve defining the response of the optical cavity, and one curve defining the emission spectrum of each population of quantum dot emitters in each light-emitting element, is maximized.

By employing multiple sizes of core/shell quantum dot emitters formed in a common polycrystalline semiconductor matrix, each different size of quantum dot emitter in each light-emitting element will have a center emission frequency and emission bandwidth. That is, the different sizes of core/shell quantum dot emitters will emit light of different colors. Within an optical cavity, one of the colors of light may be constructively reinforced at an angle normal to the substrate. Other colors of light may be constructively reinforced at other angles, as described above. Hence, the LED device will emit light of different colors at different angles from a common layer of different emitters. When a plurality of such LED devices are employed having substrates oriented at different angles, an illuminated area may be illuminated with different colors of light forming an overall white illumination while the emitters themselves are colored. Such a solid-state system provides aesthetically pleasing and useful area illumination.

In various embodiments, the optical microcavity may include two electrodes, one reflective, one semi-reflective; wherein they are separated by an inorganic semiconductor material having an index of refraction. The reflective and semi-reflective electrodes can form an effective microcavity. Moreover, the optical microcavity may be tuned for a predetermined peak emission frequency and emission bandwidth by the LED device by adjusting the separation of the reflective electrode and the semi-reflective electrode and selecting predetermined values for the indices of refraction of the intervening layers. Furthermore, the predetermined peak emission frequency and emission bandwidth of the LED device may be further accomplished by selecting a predetermined size distribution of quantum dots. Hence, the LED device may emit a single color of light, for example, red, green, blue, yellow or cyan in a direction normal to the surface of the substrate.

In various embodiments of the present invention, the support 24 can be a chandelier, a table lamp, or a floor lamp. The illuminated area 28 can be a floor, wall, ceiling, or item of furniture.

In other embodiments of the present invention, at least one substrate 22 can be a rigid planar substrate or, alternatively, at least one substrate is flexible. At least one LED device 12 may comprise a transparent substrate and transparent cover and light is emitted from both sides of the LED device 12. Alternatively, the LED device 12 can be a top-emitting device or a bottom-emitting device.

Figure 5:
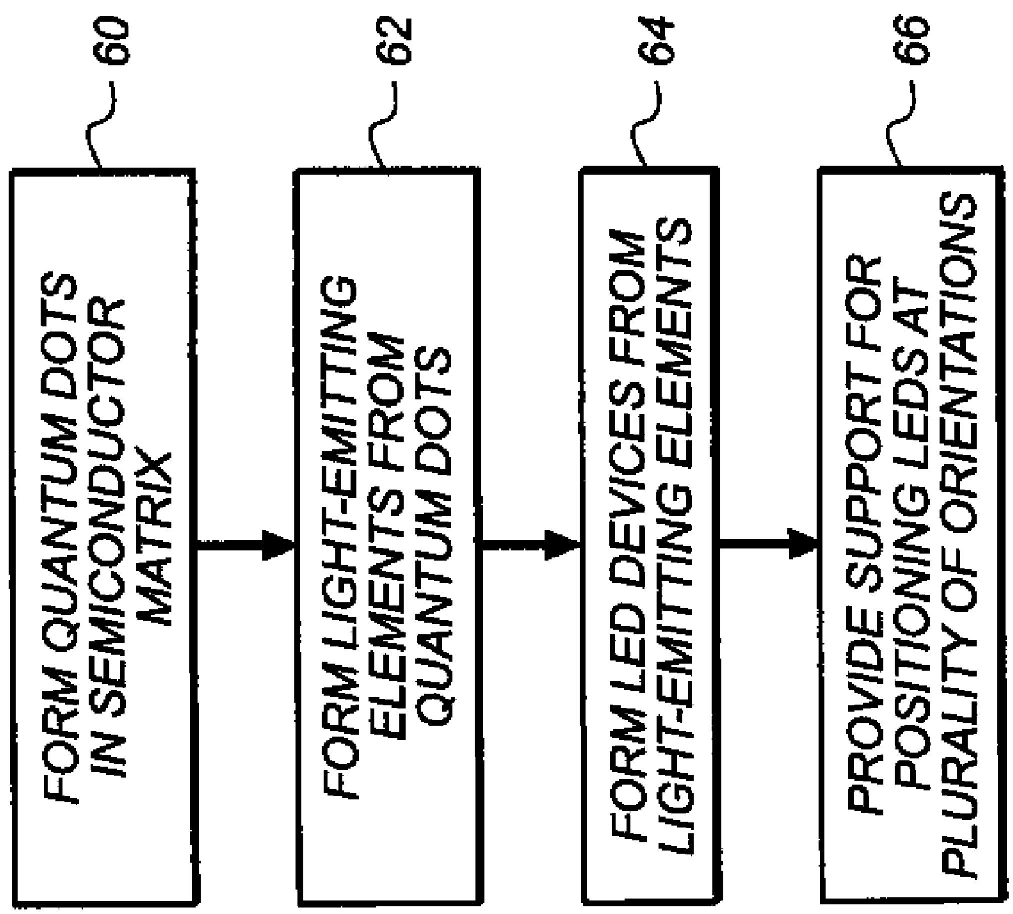
FIG. 5 is a process for making a solid-state area illumination system, according to one embodiment of the present invention.

In another embodiment of the present invention, a method of forming a solid-state area illumination system is provided (referring to FIG. 5), comprising the steps of: forming 60 multiple sizes of core/shell quantum dot emitters in a common polycrystalline semiconductor matrix, each different size of quantum dot emitter having a peak emission frequency and emission bandwidth; forming 62 a plurality of light-emitting elements, each light-emitting element including a succession of layers comprising an optical microcavity, each optical microcavity including an emissive layer containing the population of quantum dot emitters of one or more sizes, wherein an emission bandwidth of each population of quantum dot emitters in each light-emitting element is tuned to a frequency response of the optical microcavity of that light-emitting element; forming 64 a plurality of LED devices, each LED device comprising one or more light-emitting elements, each device on a separate substrate and each device emitting light at a plurality of angles relative to the substrate, the emitted light have different colored light at different angles; and providing 66 a support positioning each of the plurality of LED devices at a plurality of orientations relative to an area of illumination, said positioning being defined so that any point on any surface within the area of illumination will receive multiple colors of light from more than one of the LED devices.

The invention has been described in detail with particular reference to certain preferred embodiments thereof, but it will be understood that variations and modifications can be effected within the spirit and scope of the invention.

PARTS LIST

10 solid-state area illumination system
12 LED device
14, 14*a*, 14*b* light rays
15, 15*a*, 15*b* light rays
16*a*, 16*b* light rays
17*a*, 17*b* light rays
18*a*, 18*b* light rays
22 substrate
24 support
26 illuminated surface
28 area of illumination
30 light-emitting element
31 light ray
32 light-emitting layer
33 light ray
34 anode
35 partical reflection
39 optical cavity
39A optical cavity
39B optical cavity
42 spectral emission curve
44 peak wavelength
46 full width half maximum (FWHM)
50 light-emitting core
52 semiconductor shell
60 process step: forming quantum dot emitters
62 process step: forming light emitting elements
64 process step: forming LED devices
66 process step: providing support positioning LED devices

What is claimed is:

1. A solid-state area illumination system, comprising:

a. a plurality of LED devices, each LED device formed on a separate substrate and each LED device emitting differently colored light at different angles relative to the substrate; wherein each color of light has a frequency distribution including a peak and full width half maximum and wherein the peak frequencies of each color of light differ by at least the smallest of the full width half maximums of the frequency distributions of emitted light;

b. a support for positioning each of the plurality of LED devices at a plurality of orientations relative to an area of illumination upon a surface, so that any point within the area of illumination will receive multiple colors of light from more than one of the LED devices at different angles;

wherein each LED device comprises one or more light-emitting elements, each light-emitting element including multiple sizes of core/shell quantum-dot emitters formed in a common polycrystalline semiconductor matrix layer, each different size of quantum-dot emitter in each light-emitting element having a peak emission frequency and emission bandwidth, each light-emitting element further including a single succession of parallel layers, the single succession of parallel layers forming different optical microcavities having different respective optical path lengths at different angles with respect to the normal to the surface of the layers in the single succession of layers, wherein an emission bandwidth of each population of quantum-dot emitters in each light-emitting element is tuned to a frequency response of one of the optical microcavities of that light-emitting element.

2. The solid-state area illumination system claimed in claim 1, wherein each optical microcavity includes two electrodes, one reflective, one semi-reflective; wherein the two electrodes are separated by an inorganic semiconductor material having an index of refraction.

3. The solid-state area illumination system claimed in claim 2, wherein each optical microcavity is tuned for a predetermined peak emission frequency and emission bandwidth by the LED device, by adjusting the separation of the reflective electrode and the semi-reflective electrode and selecting predetermined values for the indices of refraction of the intervening layers.

4. The solid-state area illumination system claimed in claim 3, wherein the emission of the predetermined center emission frequency and emission bandwidth of the LED device is further accomplished by selecting a predetermined size distribution of quantum dots.

5. The solid-state area illumination system of claim 1, wherein the support is a chandelier, a table lamp, or a floor lamp.

6. The solid-state area illumination system of claim 1, wherein the illuminated area is a floor, wall, ceiling, or item of furniture.

7. The solid-state area illumination system of claim 1, wherein at least one substrate is a rigid planar substrate.

8. The solid-state area illumination system of claim 1, wherein at least one substrate is flexible.

9. The solid-state area illumination system of claim 1, wherein at least one LED device comprises a transparent substrate and transparent cover and light is emitted from both sides of the LED device.

10. The solid-state area illumination system of claim 1, wherein the LED devices emit a single color of light in a direction normal to the surface of the substrate.

11. The solid-state area illumination system of claim 10, wherein the single color of light emitted in a direction normal to the surface of the substrate is red, green, blue, yellow or cyan.

12. The solid-state area illumination system of claim 1, wherein at least one LED device is a top-emitting device.

13. The solid-state area illumination system of claim 1, wherein at least one LED device is a bottom-emitting device.

14. The solid-state area illumination system of claim 1, wherein at least two LED devices have substrates that are in a common plane.

15. The solid-state area illumination system of claim 1, wherein at least two LED devices have substrates that are in different planes.

16. A method of forming a solid-state area illumination system, comprising the steps of:

a. forming multiple sizes of core/shell quantum-dot emitters in a common polycrystalline semiconductor matrix layer, each different size of quantum-dot emitter having a peak emission frequency and emission bandwidth;

b. forming a plurality of light-emitting elements, each light-emitting element including a single succession of parallel layers, the single succession of parallel layers forming different optical microcavities having different respective optical path lengths at different angles with respect to the normal to the surface of the layers in the single succession of lavers, the single succession of layers including an emissive layer containing a population of quantum-dot emitters of two or more sizes, wherein an emission bandwidth of each population of quantum-dot emitters in each light-emitting element is tuned to a frequency response of the optical microcavity of that light-emitting element;

c. forming a plurality of LED devices, each LED device comprising one or more light-emitting elements, each device on a separate substrate and each device emitting light at a plurality of angles relative to the substrate, the emitted light have different colored light at different angles; and d. providing a support positioning each of the plurality of LED devices at a plurality of orientations relative to an area of illumination, said positioning being defined so that any point on any surface within the area of illumination will receive multiple colors of light from more than one of the LED devices.

* * * * *

UNITED STATES PATENT AND TRADEMARK OFFICE

CERTIFICATE OF CORRECTION

PATENT NO. : 7,838,889 B2
APPLICATION NO. : 11/837026
DATED : November 23, 2010
INVENTOR(S) : Ronald Steven Cok et al.

It is certified that error appears in the above-identified patent and that said Letters Patent is hereby corrected as shown below:

| Issued Patent | | Description of Error |
|---|---|---|
| Column | Line | |
| 10 | 23 | In Claim 16, delete “lavers,” and insert -- layers, --. |

Signed and Sealed this
Eighth Day of March, 2011

David J. Kappos
*Director of the United States Patent and Trademark Office*